Nov. 7, 1961 W. C. BIDDLE 3,007,489
MULTIPLE VALVE ASSEMBLY
Filed Aug. 17, 1959

INVENTOR.
WILLIAM C. BIDDLE
BY Brown, Critchlow,
Pilch & Pecklen
HIS ATTORNEYS

United States Patent Office 3,007,489
Patented Nov. 7, 1961

3,007,489
MULTIPLE VALVE ASSEMBLY
William C. Biddle, Pittsburgh, Pa., assignor to National Valve and Manufacturing Company, a corporation of Pennsylvania
Filed Aug. 17, 1959, Ser. No. 834,312
4 Claims. (Cl. 137—554)

This invention relates to a multiple valve assembly of the type in which two main valves are arranged in series in a fluid line, and a bleeder valve is arranged to vent the passage between the two main valves when they are closed.

An object of the invention is to provide an improved operating means which provides positive interconnection between the three valves at all times. This is done most conveniently by attaching a sprocket wheel to the operating stem of each valve, and interconnecting the sprocket wheels with a sprocket chain.

An additional object of the invention is to provide safety features which include a solenoid-operated interlock which will prevent opening the two main valves unless the interlock has been intentionally released. Also, a limit switch is so arranged in connection with the mechanism as to give an indication at a distant station of the position of the valve system.

These, and other objects and advantages of the invention will become apparent as the description proceeds.

Figure 1:
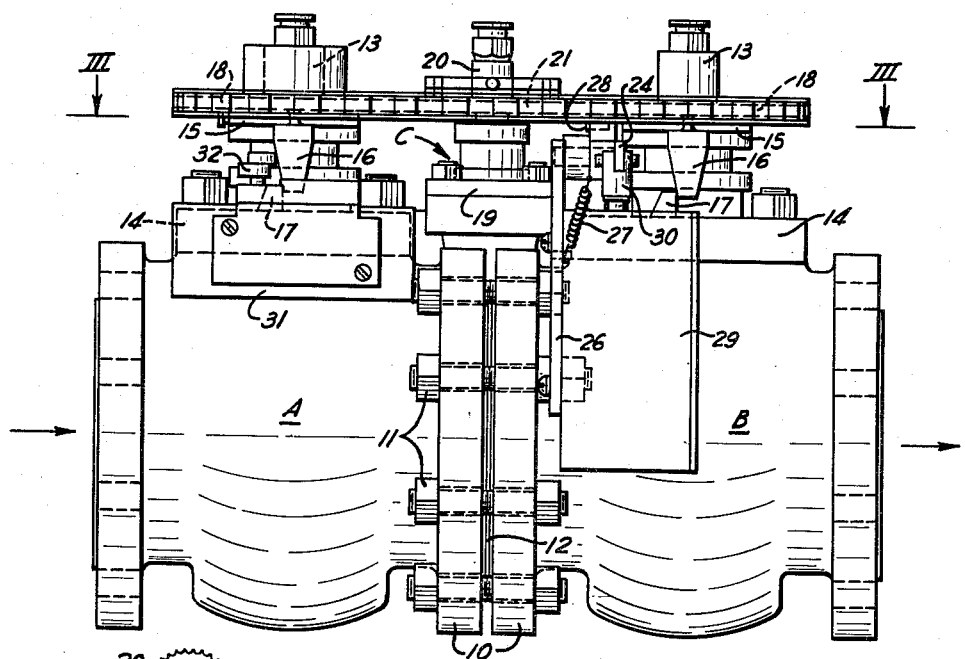
Figure 2:
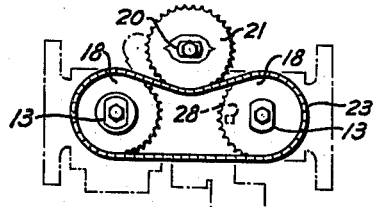
Figure 4:
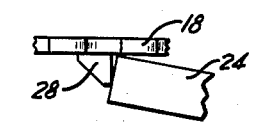
Figure 3:
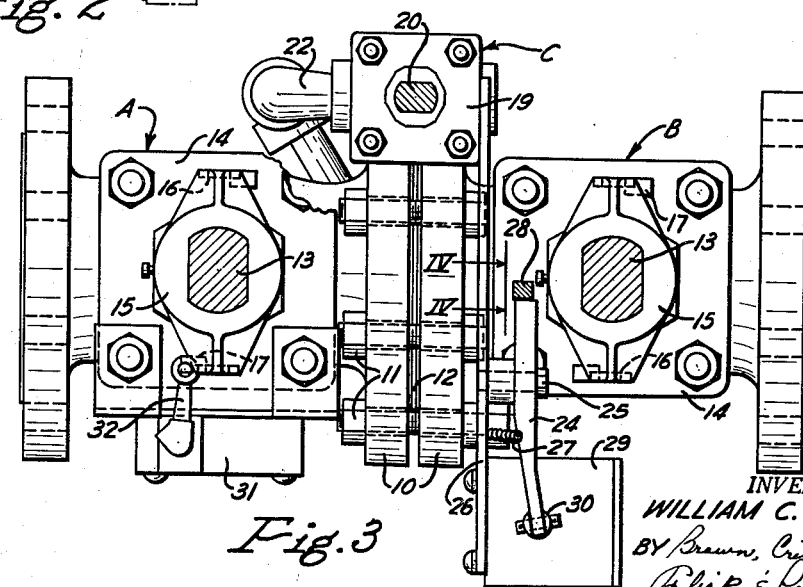

In the drawings:
FIG. 1 is a side elevation of the valve assembly;
FIG. 2 is a top plan view; and
FIG. 3 is a section on line III—III of FIG. 1.
FIG. 4 is a detail of the locking lever.

Referring to the drawings more particularly, valves A and B are valves of a conventional type known as "plug valves." The adjacent valve flanges 10 are secured together by bolts 11, and a suitable gasket 12 is compressed between the flanges to form a fluid-tight seal in a well-known manner.

Each of valves A and B has an operating stem 13 which projects through cover 14. A stop collar 15 is mounted to rotate with stem 13 and carries a stop finger 16 which engages stop lugs 17 mounted on the cover 14. A gear wheel 18 is secured to the stop collar 15, preferably by welding.

The normal flow of fluid through valves A and B is indicated by the arrows.

The bleeder valve C is a smaller plug valve which is mounted on one side of the assembly formed by valves A and B, and preferably on the center line of gasket 12 so that it is midway between valves A and B. (See FIG. 3.) Valve C has a cover 19 and an operating stem 20. A gear wheel 21 is mounted on operating stem 20.

The inlet port of bleeder valve C is connected by means of piping 22 with the outlet side of valve A. With this arrangement bleeder valve C is adapted to bleed off any fluid which collects in the conduit between the plugs of valves A and B when these valves are in the closed position.

The outlet port of bleeder valve C may be connected to any suitable waste duct to carry off any fluid which may leak past valve A when the main valves are in closed position.

The operating means for the three valves is so arranged that when the main passage through valves A and B is open, bleeder valve C is closed. When valves A and B are closed, bleeder valve C is open.

This arrangement of valves provides a positive assurance that no fluid will leak past the assembly when in closed position, assuming that all valves are in reasonably good condition. Should any fluid leak past valve A into the passage between valves A and B, it will be vented through the bleeder valve. In the absence of the bleeder valve, leakage past valve A could gradually build up pressure in the chamber between valves A and B, and eventually lead to seepage past valve B. The presence of the open bleeder valve C avoids any such result.

Valve assemblies of the general nature just described have been used in the past, but the operating means used has not been safe and reliable. This operating means has included a pantograph-like system of rigid links and levers. In this system the operation of the bleeder valve depends upon a pin operating in an open fork, and so arranged that the pin leaves the fork during certain stages of the operation. This system is not safe, since it is possible for the bleeder valve to become accidentally turned while the pin is out of the yoke, thus preventing the safe and normal operation of the valve assembly. Furthermore, this mechanical linkage system is bulky and cumbersome, and increases the force necessary to operate the valve system.

According to the present invention the three valves are provided with gear wheels, as just described, and a sprocket chain interconnects the gear wheels so as to cause the valves to move in unison.

The continuous sprocket chain 23 extends around the gear wheels 18 of valves A and B (see FIG. 2), and has a slight amount of slackness. The gear wheel 21 of the valve C engages the outside of the chain 23 and presses the chain inwardly between the sprockets 18. Since the three gear wheels are of the same size, rotation of one of the valve stems 13 by means of a wrench, will cause identical rotation of the stems of the other two valves. The gear wheels are pre-set so that when valves A and B are closed, valve C is open. Then when one of the stems 13 is rotated through 90° so as to open valves A and B, valve C is closed.

As an alternate construction the gear wheels may be directly interconnected with each other with a loose or sloppy interfit in order to permit a certain amount of relative motion between the gears when the valves are being assembled and tightened into place.

The operation of the three valves by means of positively interconnected gear wheels has a number of important advantages.

In the first place, it guarantees that all three valves are coupled together at all times. This is very important, since valve assemblies of this type are usually used in applications where they may not be operated for months or years, and if the bleeder valve is permitted to escape from the control system, it might through ignorance or inattention be operated separately, with disastrous consequences.

In addition, much less torque is required to turn the three valves than when the pantograph leverage is used.

The pantograph leverage system is bulky and space-consuming, and is not easily accommodated on furnace burner faces, where often a number of units must be installed in a limited space. By contrast, the device of the present invention is extremely compact.

A wider variety of valve spacings and arrangements to suit a variety of valve locations are possible with the present invention than with prior art devices.

With the present invention a gear reduction may be included for the operation of large valves, whereas this is not possible with the pantograph design.

The invention also provides a locking mechanism which prevents opening the main valves until a special release mechanism has been tripped. This release mechanism may be operated from a remote location.

The locking mechanism includes a lock lever 24 which is pivoted at 25 on bracket 26 which is bolted to the casing of valve B.

The outer end of lock lever 24 is normally spring-biased to a lower position by means of spring 27, thereby maintaining the inner end of the lock lever in position for engagement with a locking detent 28 welded to the underside of gear wheel 18 of valve B.

A solenoid 29 is attached to bracket 26 and has its operating rod 30 attached to the outer end of locking lever 24. When valves A and B are closed and the solenoid is operated, the rod 30 pushes up on the outer end of locking lever 24, releasing the lever from the locking detent 28. When the parts have reached this position the valve assembly may be operated to the open position.

As soon as the solenoid 29 is de-energized the spring 27 pulls the locking lever back toward locking position. When, subsequently, the main valves are moved to closed position, the detent 28 rides over the end of the locking lever 24 (see FIG. 4) and the valves are again locked in closed position. Thus, the locking mechanism permits the main valves to be closed at any time, whether or not the solenoid is energized. But once closed, the main valves cannot be opened until the solenoid is energized.

It will, of course, be understood that the circuit which controls the solenoid 29 may be under control of a switch located at a distance from the valve assembly.

A limit switch 31 is mounted on the housing of valve A, and its operating arm 32 is contacted by the stop finger 16 of valve A when the main valves are fully closed. The limit switch may be placed in a circuit to a visual signal at a remote location. The limit switch may also be connected with a safety interlocking system. It might be desirable in some applications to install a second limit switch to function when the main valves are fully open.

It will be understood by those familiar with the art that this invention provides a valve assembly for installation in a pipe line and which forms a simple, compact, easily operated, and positive device for isolating vessels, furnaces, or a portion of a piping system from further entrance of the fluid being handled.

It can be used wherever absolute isolation from a fluid in a pipe line is required, such as: in fluid fuel lines to steam generator, furnace, heater or combustion turbine burners; in lines carrying toxic or explosive fluids to closed vessels into which personnel must enter at times, or within which explosive conditions might exist; or in situations where an alternate supply of fluid is connected to a primary system for emergency usage. An example of this latter situation would be a river-water emergency supply line connected to a plant drinking water system, which is also used for fire fighting.

While the valves disclosed in the example illustrated are plug valves, it should be understood that the invention can be used with any equivalent valves having rotatable stems.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a valve system of the type which comprises a pair of main rotatable valves arranged in series, and a bleeder valve connected to the conduit between the main valves, said bleeder valve being arranged to be in open position when the two main valves are in closed position, the improvement which comprises:

a gear wheel mounted on the stem of each of the main valves and the bleeder valve, respectively;

and means positively and continuously interconnecting the gear wheels of the three valves;

whereby, when a first main valve is moved to closed position the second main valve is also moved to closed position and the bleeder valve is moved to open position, and when the first main valve is moved to open position the second main valve is also moved to open position and the bleeder valve is moved to closed position.

2. A device as specified in claim 1 in which the means positively and continuously connecting the gear wheels is a sprocket chain.

3. A device as specified in claim 1 in which a gear wheel of one of the main valves carries a locking detent;

a locking lever constructed and arranged to engage the locking detent to hold the main valves closed;

a spring means biasing the locking lever toward locking position;

and a solenoid-operated rod connected to the locking lever for disengaging the locking lever from the locking detent.

4. A device as specified in claim 1 in which a limit switch is mounted on one of the main valves;

the stem of said main valve carries a finger which engages said limit switch when said main valve is closed;

and indicating means connected to the limit switch constructed and arranged to give an indication that the main valves are closed.

References Cited in the file of this patent

UNITED STATES PATENTS

| | | |
|---|---|---|
| 600,944 | Burdett | Mar. 22, 1898 |
| 958,574 | Allen | May 17, 1910 |
| 1,776,363 | Manning | Sept. 23, 1930 |
| 2,482,873 | Roberts | Sept. 27, 1949 |
| 2,704,540 | Engelder | Mar. 22, 1955 |